United States Patent
Chang et al.

(10) Patent No.: US 11,866,639 B2
(45) Date of Patent: Jan. 9, 2024

(54) METHOD AND MATERIAL TO REDUCE ACID-CARBONATE REACTION RATE BY ENDOTHERMIC REACTION

(71) Applicant: ARAMCO SERVICES COMPANY, Houston, TX (US)

(72) Inventors: Fakuen Frank Chang, Houston, TX (US); Wenwen Li, Pearland, TX (US)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 17/660,738

(22) Filed: Apr. 26, 2022

(65) Prior Publication Data

US 2022/0348815 A1 Nov. 3, 2022

Related U.S. Application Data

(60) Provisional application No. 63/181,572, filed on Apr. 29, 2021.

(51) Int. Cl.
| | | |
|---|---|---|
| C09K 8/528 | (2006.01) | |
| C09K 8/92 | (2006.01) | |
| C09K 23/52 | (2022.01) | |
| C09K 23/18 | (2022.01) | |
| C09K 8/36 | (2006.01) | |

(52) U.S. Cl.
CPC .............. C09K 8/528 (2013.01); C09K 8/36 (2013.01); C09K 8/92 (2013.01); C09K 23/18 (2022.01); C09K 23/52 (2022.01)

(58) Field of Classification Search
None
See application file for complete search history.

(56) References Cited

U.S. PATENT DOCUMENTS

| | | | |
|---|---|---|---|
| 3,076,762 A | 2/1963 | Dill | |
| 4,371,443 A | 2/1983 | Keeney | |
| 5,110,486 A | 5/1992 | Manalastas et al. | |
| 5,373,901 A | 12/1994 | Norman et al. | |
| 5,948,735 A | 9/1999 | Newlove et al. | |
| 6,357,527 B1 | 3/2002 | Norman et al. | |
| 6,527,051 B1 | 3/2003 | Reddy et al. | |
| 6,652,895 B2 | 11/2003 | Porzio et al. | |
| 6,722,434 B2 | 4/2004 | Reddy et al. | |
| 7,049,272 B2 | 5/2006 | Sinclair et al. | |
| 7,205,264 B2 | 4/2007 | Boles | |
| 7,455,112 B2 | 11/2008 | Moorehead et al. | |
| 7,686,084 B2 | 3/2010 | Reddy et al. | |
| 8,257,738 B2 | 9/2012 | Porzio et al. | |
| 8,287,637 B2 | 10/2012 | Carlini et al. | |
| 9,920,608 B2 | 3/2018 | van Oort et al. | |
| 10,053,621 B2 | 8/2018 | Fontenelle et al. | |
| 2009/0145607 A1* | 6/2009 | Li | C09K 8/685 166/308.5 |
| 2014/0221256 A1* | 8/2014 | Holtsclaw | C09K 8/86 507/225 |
| 2015/0218439 A1 | 8/2015 | Dean et al. | |
| 2017/0233640 A1* | 8/2017 | Chopade | C09K 8/80 166/308.5 |
| 2020/0061191 A1 | 2/2020 | Patel | |
| 2020/0116001 A1 | 4/2020 | Sayed et al. | |
| 2021/0403799 A1* | 12/2021 | Li | C12M 21/08 |

FOREIGN PATENT DOCUMENTS

| | | |
|---|---|---|
| AU | 2016301235 A1 | 2/2018 |
| CA | 2547185 C | 7/2011 |
| SU | 661103 A1 | 5/1979 |
| WO | 2017039707 A1 | 3/2017 |

OTHER PUBLICATIONS

International Search Report Issued in Corresponding Application No. PCT/US2022/026996, dated Aug. 2, 2022, 5 pages.
Written Opinion Issued in Corresponding Application No. PCT/US2022/026996, dated Aug. 2, 2022, 8 pages.

* cited by examiner

*Primary Examiner* — John J Figueroa
(74) *Attorney, Agent, or Firm* — Osha Bergman Watanabe & Burton LLP

(57) ABSTRACT

Well treatment fluids may include solid particles comprising one or more components selected from the group consisting of urea, ammonium nitrate, ammonium chloride, barium hydroxide, and ammonium thiocyanate. These well treatment fluids may also include a carrier fluid, which may be an aqueous polymeric fluid, an oil, or combinations thereof. The aqueous polymeric fluid may include a polymer selected from the group consisting of guar gum, hydroxypropyl guar, carboxymethyl hydroxypropyl guar, cellulose, or polyacrylamide. The oil may include a material selected from the group consisting of diesel, mineral oil, and wax. Methods for reducing an acid carbonate reaction in a carbonate formation may include pumping a composition of solid particles into a formation; releasing the solid particles from the capsules or emulsion within the formation; and injecting an acid following the releasing step or during pumping, wherein the acid carbonate reaction is carried out at a reduced reaction rate.

15 Claims, No Drawings

METHOD AND MATERIAL TO REDUCE ACID-CARBONATE REACTION RATE BY ENDOTHERMIC REACTION

BACKGROUND

In order to extract hydrocarbons from deep carbonate subterranean formations, treatments are often performed with acidic fluids, which may include inorganic acids, organic acids, or a combination of both. These acidic fluids are injected through wellbores to react with and dissolve parts of the carbonate formations. In successful treatments, the dissolution process results in the formation of highly conductive flow channels, which may reach larger part of the hydrocarbon bearing formation, thereby enhancing hydrocarbon production.

The temperature of a carbonate subterranean formation increases as its depth increases. However, elevated temperatures increase the reactivity of an acid with carbonate, which may result in significant operational limitations in terms of performance or cost. For instance, radial penetration of the rock matrix of the formation is limited even when large volumes of acid are used because the acid reacts rapidly with the rock matrix before achieving deep penetration. Therefore, the acid is spent only on rock mass around the wellbore and loses its dissolving capacity as it penetrates deeper and away from the wellbore. This leads to the formation of channels near the wellbore instead of effective flow channels connecting the region deep into the formation to the wellbore, thereby limiting hydrocarbon production.

SUMMARY

In one aspect, embodiments disclosed herein are directed to well treatment fluids. The well treatment fluids may include solid particles comprising one or more components selected from the group consisting of urea, ammonium nitrate, ammonium chloride, barium hydroxide, and ammonium thiocyanate. The well treatment fluids may also include a carrier fluid selected from the group consisting of an aqueous polymeric fluid, an oil, and combinations thereof. In the carrier fluid, the aqueous polymeric fluid may include a polymer selected from the group consisting of guar gum, hydroxypropyl guar, carboxymethyl hydroxypropyl guar, cellulose, and polyacrylamide. Further, the polymer in the aqueous polymeric fluid may be crosslinked by a crosslinker selected from the group consisting of borate, titanate, and zirconate. In the carrier fluid, the oil may include a material selected from the group consisting of diesel, mineral oil, and wax.

In another aspect, embodiments disclosed herein are directed to methods for reducing an acid carbonate reaction in a carbonate formation. The methods may include pumping a composition of solid particles into a formation, wherein the solid particles comprise one or more components selected from the group consisting of urea, ammonium nitrate, ammonium chloride, barium hydroxide, and ammonium thiocyanate, and wherein the solid particles are encapsulated in capsules or in an emulsion phase. The methods may also include releasing the solid particles from the capsules or emulsion within the formation, initiating an endothermic reaction and cooling the formation. The methods may further include injecting an acid following the releasing step or during the pumping, wherein the acid carbonate reaction is carried out at a reduced reaction rate.

Other aspects and advantages of this disclosure will be apparent from the following description made with reference to the accompanying drawings and the appended claims.

DETAILED DESCRIPTION

Several strategies have been employed for retarding the reaction rate between the acid and the rock matrix of a carbonate subterranean formation. For example, the use of organic acids or retarding agents alone or in combination with hydrochloric acid in high concentrations may limit the hydrogen ion dissociation by limiting the availability free water and thus the availability of hydrogen ions. Alternative strategies have included limiting the diffusion of hydrogen ions from the bulk solution by making the reaction boundary layer on the rock surface less accessible. For example, a high concentration of ions such as $Ca^{2+}$ or $Mg^{2+}$ near the rock surface may be added by introducing the corresponding divalent salts including $MgCl_2$, $CaCl_2$ to reduce the mean free path and hence hindering the diffusion of hydrogen ions. However, limitations still exist, such as the limited solubility of the resultant products of organic acids with the matrix material.

Accordingly, there exists a need for well treatment fluids or compositions and methods retarding the reaction rate between an acid and a carbonate rock in subterranean formations containing a hydrocarbon reservoir. More particularly, the present disclosure is directed to compositions and methods for reducing the temperature at which the acid and carbonate react by triggering an endothermic reaction from a fluid composition pumped down a formation, thereby reducing the acid-rock reaction kinetics.

In one or more embodiments, the well treatment fluid may be contained in a viscous fluid or pad (polymeric water solution or viscosified oil), which may be pumped in the well before the main stimulation fluid containing the acid (mineral or organic) or with an added spacer fluid between the pad and the acid.

In some embodiments, the well treatment fluid may include solid particles including urea, ammonium nitrate, ammonium chloride, barium hydroxide, ammonium thiocyanate, or combination of these components. These solid particles may be in an encapsulated form or in an emulsified form. These solid particles are thus not dissolved in water during the mixing of the well treatment fluid at the surface before being pumped into the formation because of their protective surface in the form of encapsulation or emulsion. It is only when the well treatment fluid is pumped down the well and entering the formation that the dissolution of the capsules or release from the emulsion takes place via shear through the perforations and release the solid particles, triggering the endothermic reaction at the bottom of the well and inside the fracture. As the well treatment fluid to flows into the fracture, the endothermic reaction cools down the indigenous formation temperature resulting in an acid-rock reaction taking place at a lowered temperature environment. The acid-rock reaction rate is thus reduced, leading to a deeper live acid penetration.

In some embodiments, the well treatment fluid may also include a pad or a carrier fluid. In some embodiments, the well treatment fluid may include as a carrier fluid an aqueous polymeric fluid. The aqueous polymeric fluid may include a polymer selected from the group consisting of guar gum, hydroxypropyl guar (HPG), carboxymethyl hydroxypropyl guar (CMHPG), cellulose, and polyacrylamide. According to one or more embodiments, the polymer in the aqueous polymeric fluid may be crosslinked by a crosslinker selected from the group consisting of borate, titanate, and zirconate.

In some embodiments, the well treatment fluid may also include an oil-based pad, which is a viscous oil or a gelled and viscosified oil. The viscosified oil may include phosphate esters in an oil such as diesel. In particular, the oil gelling agents may include, but not limited to, phosphate esters in the concentration from 1 gal per thousand of the total fluid to 30 gallons per thousand gallons of the total fluid.

In some embodiments, the main stimulation fluid may contain an acid, which may be mineral, inorganic, or organic, and one or more chelating agents such as ethylenediaminetetraacetic acid (EDTA), nitrilotriacetic acid (NTA), diethylenetriaminepentaacetic acid (DTPA), glutamic acid diacetic acid (GLDA), or a mixture of one or more acids and chelating agents.

According to one or more embodiments, the solid particles of the well treatment fluid may be in an emulsion form or an encapsulated form. In particular, the solid particles may be included in an emulsion. For example, the solid particles may be trapped in dispersed droplets of oil in water emulsion, oil in water pickering emulsion, or oil in oil emulsion. The solid particles may be isolated from water by adsorbing an oil layer on the surface of the solid particles. The solid particles may be treated by oil wetting surfactant to stabilize the adsorption of oil. The solid particles, the surfactants and the oil may then be blended to form a stable suspension system or slurry. The surfactant may be selected from but not limited to alkylbenzene sulfonate, polyolefin amide alkeneamine, monoglycerides, esters from monoglycerides and diacetyltartaric acid (DATA esters, sodium or calcium stearoyl-2-lactylate (SSL), lecithin. The surfactant concentration in the suspension system is in the range of 0.01% to 10% by volume and the solid concentration in the suspension is 2% to 50% by volume. The oil is a non-water miscible liquid or solid, which can be but not limited to diesel, mineral oil, or wax. Such emulsion may be an oil in water emulsion and may comprise an oil selected from the group consisting of diesel, mineral oil, and wax. The emulsion may also include one or more surfactants including alkylbenzene sulfonate, polyolefin amide, alkeneamine, monoglycerides, diacetyltartaric ester, sodium stearoyl-2-lactylate, calcium stearoyl-2-lactylate, or lecithin. According to one or more embodiments, in the emulsion containing the solid particles, the surfactant may have a concentration of about 0.01 vol % (volume percent) to about 10 vol %, or about 0.05 vol % to about 5 vol %, or about 0.1 vol % to about 1 vol %, or about 0.5 vol % to about 1 vol %, relative to the emulsion and the solid particles may have a concentration of about 2 vol % to about 50 vol %, or about 5 vol % to about 45 vol %, or about 10 vol % to about 40 vol %, or about 15 vol % to about 35 vol %, or about 20 vol % to about 30 vol %, relative to the emulsion.

Alternatively, the solid particles may be encapsulated with an encapsulation material, which may have a matrix structure, a core-shell structure, or a combination of both. In some embodiments, matrix structure may include the solid particles dispersed in an encapsulation material, such as beads, microparticles, or microspheres. In some embodiments, the core/shell structure may include the solid particles confined as one core by one shell or more of encapsulation material, such as microparticles or microcapsules. In some embodiments, the matrix structure or core-shell structure may include one or more natural polymers including starch, cellulose, gellan gum, chitosan, or dextrin. In some embodiments, the matrix structure or core-shell structure may include one or more synthetic polymers including polyester, polyurethane, polyurea, polyvinyl alcohol, polycaprolactone, polyamide, or polyacrylate. The ratio of the encapsulation material to the solid particles may be in a range of 0.03:1 to 7:1 by volume, or 0.05:1 to 5:1, or 0.1:1 to 3:1, or 0.5:1 to 2:1. Both physical and chemical methods may be used to prepare the individualized encapsulated solid particles. Physical methods may include extrusion, spray coating, or spray drying. Chemical methods may include interfacial confined polymerization, in situ polymerization, or interfacial polycondensation.

According to one or more embodiments, the concentrations of the solid particles contained in the well treatment fluid with the pad may be in a range of about 0.1 vol % to about 50 vol %, or of about 0.5 vol % to about 45 vol %, or of about 1 vol % to about 40 vol %, or of about 5 vol % to about 35 vol %, or of about 10 vol % to about 30 vol %, or of about 15 vol % to about 25 vol % relative to the volume of well treatment fluid. In one or more embodiments, the solid particles may be added in the well treatment fluid with the pad. Additionally, in some embodiments, the solid particles may be added to the main stimulation fluid. The concentration of the solid particles added to the main stimulation fluid may be in a range of about 0.1 vol % to 30 vol %, or of about 0.5 vol % to 25 vol %, or of about 1 vol % to 20 vol %, or of about 5 vol % to 15 vol % relative to the combination of well treatment fluid and main stimulation fluid.

According to one or more embodiments, the inclusion of solid particles in the well treatment fluid or in the main stimulation fluid allows the temperature in the fracture to remain low for a longer duration when the stimulation fluid reacts with the rock of the fracture wall.

Furthermore, in some embodiments, the solid particles may be spherical or irregularly shaped. In particular, the solid particles' shape may be spherical or with an aspect ratio as close to spherical as possible. The solid particles before encapsulation may have a particle size in a range of about 0.1 μm (micrometer) to about 1000 μm, or of about 0.5 μm to about 500 μm, or of about 1 μm to about 100 μm, or of about 5 μm to about 50 μm.

According to one or more embodiments, the well treatment fluid may optionally further comprise a spacer. In particular, the spacer may be included in the well treatment fluid to be introduced between pad and main stimulation fluid, which contains an acid to separate the pad and the main stimulation fluid if compatibility between the pad and stimulation is a concern. In some embodiments, the spacer may include ammonium chloride, potassium chloride, sodium chloride, and gelling agents such as guar gum, cellulose, or polyacrylamide, and derivative of these polymers.

According to the one or more embodiments, the well treatment fluid may be introduced in a location of a carbonate formation and where a temperature near the location is reduced, thus allowing for a reduced rate of acid-carbonate reaction.

In some embodiments, the present disclosure relates to methods for reducing an acid carbonate reaction in a carbonate formation. The methods may include pumping a composition of solid particles into a formation, wherein the solid particles comprise one or more components selected from the group consisting of urea, ammonium nitrate, ammonium chloride, barium hydroxide, and ammonium thiocyanate, and wherein the solid particles are encapsulated in capsules or in an emulsion phase. The methods may also include releasing the solid particles from the capsules or emulsion within the formation, initiating an endothermic reaction and cooling the formation. The methods may also include injecting an acid following the releasing step, wherein the acid carbonate reaction is carried out at a reduced reaction rate.

More particularly, when treating a carbonate formation by acid fracturing, a viscous fluid or pad may first be pumped to create the fracture. The pad may then be followed by the reactive fluid to etch the surface of the created fracture. These reactive fluids may be various forms of acids, such as straight hydrochloric acid (HCl), a mixture of HCl and an organic acid, an emulsified acid, or a gelled acid. In one or more embodiments, the methods may use a well treatment fluid including compositions of solid particles and a pad to reduce the temperature by triggering an endothermic reaction. Additionally, in the methods according one or more embodiments, an optional spacer fluid may be added between the well treatment fluid containing the solid particles and the pad, and the main stimulation fluid containing one or more acids. These solid particles are not dissolved in water during the mixing at the surface of the formation because they are protected by encapsulation or emulsification. When the well treatment fluid and main stimulation fluid are pumped down the well and enter the formation, the dissolution of the capsules or release of the solid particles from the emulsion may be carried out with the shear through perforations, thereby triggering an endothermic reaction at the bottom of the well and inside the fracture. As the well treatment fluid and main stimulation fluid continue to flow into the fracture and formation, the endothermic reaction cools down the carbonate formation temperature. As a result, the acid-rock reaction takes place at a lowered temperature, which result in a reduced acid rock reaction rate, leading to deep live acid penetration.

In one or more embodiments, the triggering of the release of the solid particles from the capsules or emulsion within the formation may be achieved by an external chemical mechanism. For example, a controlled release of the solid particles may be triggered by various external stimuli, such as temperature, pH, shear rate, or through the introduction of oxidizing agents, such as ammonium persulfate, calcium peroxide, or reducing agents. The use of such external triggering materials depends on the encapsulation method used. These external triggering materials may be pre-added in the well treatment fluid or main stimulation fluid. These external triggering materials may be encapsulated or emulsified.

In some embodiments, the methods according to the present disclosure may include conducting acid fracturing fluid preparation at the wellsite. In some embodiments, additional additive pumps may be used to add the reactants into the well treatment fluid before its injection into the wellbore.

In one or more embodiments, the method of the present disclosure may include pumping a well treatment fluid containing the compositions of solid particles into the wellbore at a pump rate of about 15 to about 65 barrels per minute, such that the injected well treatment fluid reaches the bottom of the well in about 10 minutes to about 45 minutes. The method may further include dissolving or breaking the capsules or emulsion of solid particles and releasing these solid particles when the well treatment fluid reaches the bottom of the well and enters the formation through perforations, where the dissolution or breaking is caused by the shear of the well treatment fluid having a shear rate ranging from about 1500 $sec^{-1}$ (inverse second) to about 5000 $sec^{-1}$. The released solid particles may then enter into contact and get dissolved in water and trigger an endothermic reaction. As the well treatment fluid fractures the formation rock and continues to flow into the fracture and formation, the endothermic reaction may cool down the indigenous formation temperature. The main stimulation fluid may be injected immediately following the well treatment fluid in order for the acid-rock reaction to take place at a lower temperature, and therefore at a reduced reaction rate. This retards the spending of the main stimulation fluid leading to deep live acid penetration.

In some embodiments, in these methods, the step of contacting may include introducing the well treatment fluid and main stimulation fluid into the formation in separate stages, optionally via the same or different tubings, such as the same or different coiled tubings. In some embodiments, a spacer may be introduced after the well treatment fluid and before the main stimulation fluid.

In some embodiments, the methods may further include producing hydrocarbons from the carbonate formation, which contain highly conductive channel networks formed by the retarded reaction rate of the acid within the formation.

While only a limited number of embodiments have been described, those skilled in the art having benefit of this disclosure will appreciate that other embodiments can be devised which do not depart from the scope of the disclosure.

Although the preceding description has been described here with reference to particular means, materials and embodiments, it is not intended to be limited to the particulars disclosed here; rather, it extends to all functionally equivalent structures, methods and uses, such as those within the scope of the appended claims.

The presently disclosed methods and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" or "optional" mean that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

The invention claimed is:

1. A well treatment fluid, comprising:
   solid particles comprising one or more components selected from the group consisting of urea, ammonium nitrate, ammonium chloride, barium hydroxide, and ammonium thiocyanate; and
   a carrier fluid selected from the group consisting of an aqueous polymeric fluid, an oil, and combinations thereof,
      wherein the aqueous polymeric fluid comprises a polymer selected from the group consisting of guar gum, hydroxypropyl guar, carboxymethyl hydroxypropyl guar, cellulose, and polyacrylamide, wherein the polymer is crosslinked by a crosslinker selected from the group consisting of borate, titanate, and zirconate; and
      wherein the oil comprises a material selected from the group consisting of diesel, mineral oil, and wax.

2. The well treatment fluid of claim 1, wherein the solid particles are in a concentration of about 0.1 vol % (volume percent) to about 50 vol % relative to the volume of well treatment fluid.

3. The well treatment fluid of claim 1, wherein the solid particles have a particle size in a range of about 0.1 μm (micrometer) to about 1000 μm.

4. The well treatment fluid of claim 1, wherein the solid particles are encapsulated in an encapsulation material having a matrix structure, a core-shell structure, or a combination of both.

5. The well treatment fluid of claim 4, wherein the matrix structure or core-shell structure comprise one or more natural polymers selected from the group consisting of starch, cellulose, gellan gum, chitosan, and dextrin.

6. The well treatment fluid of claim 4, wherein the matrix structure or core-shell structure comprise one or more synthetic polymers selected from the group consisting of polyester, polyurethane, polyurea, polyvinyl alcohol, polycaprolactone, polyamide, and polyacrylate.

7. The well treatment fluid of claim 4, wherein the ratio of the encapsulation material to the solid particles is in a range of 0.03:1 to 7:1 by volume.

8. The well treatment fluid of claim 1, wherein the solid particles are in an emulsion.

9. The well treatment fluid of claim 8, wherein the emulsion is an oil in water emulsion.

10. The well treatment fluid of claim 1, wherein the oil is a viscosified oil comprising phosphate esters.

11. The well treatment fluid of claim 8, wherein the emulsion comprises one or more surfactants selected from the group consisting of alkylbenzene sulfonate, polyolefin amide, alkeneamine, monoglycerides, diacetyltartaric ester, sodium stearoyl-2-lactylate, calcium stearoyl-2-lactylate, and lecithin.

12. The well treatment fluid of claim 10, wherein the one or more surfactants have a concentration of about 0.01 vol % (volume percent) to about 10 vol % relative to the emulsion and the solid particles are in a concentration of about 2 vol % to about 50 vol % relative to the emulsion.

13. The well treatment fluid of claim 1, further comprising a spacer.

14. The well treatment fluid of claim 13, wherein the spacer comprises ammonium chloride.

15. A method for reducing a temperature near a location of a carbonate formation, comprising: introducing the well treatment fluid of claim 1 in the location of the carbonate formation.

* * * * *